United States Patent [19]
Doege et al.

[11] Patent Number: 5,025,136
[45] Date of Patent: Jun. 18, 1991

[54] DEVICE FOR AND METHOD OF APPLYING VOLTAGE TO A HEATING RESISTOR IN A MOTOR VEHICLE IN DEPENDENCY ON OPERATING CONDITIONS OF THE VEHICLE

[75] Inventors: Mathias Doege, Korntal-Muenchingen; Wunibald Frey, Schwieberdingen, both of Fed. Rep. of Germany

[73] Assignee: Robert Bosch GmbH, Stuttgart, Fed. Rep. of Germany

[21] Appl. No.: 515,110

[22] Filed: Apr. 27, 1990

[30] Foreign Application Priority Data
Jun. 15, 1989 [DE]  Fed. Rep. of Germany ....... 3919562

[51] Int. Cl.⁵ .............................................. H05B 1/02
[52] U.S. Cl. .................................. 219/508; 219/202; 219/203; 219/494; 219/497; 219/485; 123/179 B
[58] Field of Search ............................... 219/200-204, 219/486, 494, 497, 485, 501, 508, 509; 322/7-9

[56] References Cited
U.S. PATENT DOCUMENTS

| | | | |
|---|---|---|---|
| 4,084,126 | 4/1978 | Clements | 322/8 |
| 4,673,797 | 6/1987 | Weiricle | 219/203 |
| 4,730,097 | 3/1988 | Campbell | 219/203 |
| 4,862,055 | 8/1989 | Maroyama et al. | 219/203 |
| 4,884,018 | 11/1989 | Meure et al. | 219/203 |
| 4,902,874 | 2/1990 | Tachimori et al. | 219/203 |

FOREIGN PATENT DOCUMENTS

| | | | |
|---|---|---|---|
| 2705049 | 8/1977 | Fed. Rep. of Germany . | |
| 3801478 | 2/1989 | Fed. Rep. of Germany . | |
| 2115241 | 9/1983 | United Kingdom | 219/203 |

Primary Examiner—M. H. Paschall
Attorney, Agent, or Firm—Michael J. Striker

[57] ABSTRACT

Disclosed is a device for and a method of applying output voltage from a power generator to a heating resistor in a motor vehicle. During the standstill condition of the vehicle the heating resistor is connected directly to the generator and a power supply network connected parallel to the terminals of a battery, is disconnected from the generator. The output voltage of the generator is regulated to increased values to achieve a higher efficiency in the heating resistor. During the travel of the motor vehicle, the heating resistor is connected in series with the power supply network and a regulated voltage from the power generator is applied across the series connection. The output voltage is regulated such that a nominal voltage is maintained at the power supply network. The switchover between the standstill and running operational conditions is provided by two switching devices which are controlled by a control device in dependency on operational conditions of the motor vehicle.

9 Claims, 3 Drawing Sheets

DEVICE FOR AND METHOD OF APPLYING VOLTAGE TO A HEATING RESISTOR IN A MOTOR VEHICLE IN DEPENDENCY ON OPERATING CONDITIONS OF THE VEHICLE

BACKGROUND OF THE INVENTION

The present invention relates to an electrical heating in a motor vehicle and more particularly, to a device for and a method of applying voltage to a heating resistor in a motor vehicle having a power generator and a power supply network connected across terminals of a battery.

To improve electrical power supply to a heating resistor, for example to a heated front pane of a motor vehicle, different possibilities are known which achieve a high heating efficiency.

For example, it is known to connect the power generator either to the power supply network whereby the output voltage of the generator is regulated to the nominal voltage value of the network, or the generator is connected to power supply of the heating resistor whereby in order to achieve a higher heating efficiency the generator is regulated to deliver an increased output voltage.

Since the power generator when connected to the heating resistor, serves exclusively for energizing the heating resistor, a high heating efficiency is provided even at a low rotary speed of the generator. Nevertheless, since during the heating operation both the battery and other electrical consuming devices have to be disconnected from the power generator, the power supply to consuming devices of the power supply network is effected by the battery only. The battery power supply however is possible only for a relatively short time before the battery is excessively discharged. Therefore, this solution can be provided only during the standstill of the motor vehicle when it is possible to minimize the energization of the consuming devices to save the charge of the battery.

The heating operation during the running of the motor vehicle would be possible when the output voltage of the generator be limited to the nominal voltage of the power supply network; this however would lead to a lower efficiency of the heating resistor.

A device of this kind for heating for a short time with an increased voltage and for a longer time with a nominal voltage of the power supply network is known from the DE-OS 27 05 049. In this prior art device the heating element is connected either directly to the output of the power generator and supplied with voltage which is distinctly higher than the nominal voltage of the power supply network whereby the power supply network with the battery are disconnected from the power generator. As mentioned above, this connection can be maintained only for a short time because the battery would become excessively discharged. For energizing the heating resistor for a longer period of time the prior art device provides a switch-over mechanism for connecting the heating resistor and the battery directly to the output of the power generator and during this connection the output voltage of the generator is limited to the nominal voltage of the power supply network.

A possibility to feed the heating resistor at an increased voltage with simultaneous feeding of the other electrical consuming devices at a nominal voltage of the power supply network is known from the DE-PS 38 01 478. In this embodiment, the heating element is directly connected to the output of the power generator and supplied with an increased generator voltage.

The nominal power supply voltage for the remaining consuming devices is derived from the increased voltage by means of a converter. However, an adequate power supply due to the requisite design of the converter for sufficient load currents can be achieved only with difficulties and, in addition, is very costly.

Furthermore, from the DE-PS 38 01 478 it is known to connect a heating resistor in series with the power supply network and during the non-heated operational condition of the vehicle, the heating resistor is short circuited.

By means of such a series connection the generator can energize the consuming devices up to a certain voltage level even during the heating mode of operation. Therefore, a high power heating is made possible both during the stillstand condition as well as during the running condition of the motor vehicle.

In this kind of the electrical power supply of a heating resistor the generator output voltage is regulated such that the electrical consuming devices downstream of the heating resistor are supplied with the nominal voltage level of the battery.

The disadvantage of this known arrangement is the necessity to impart to the power generator a relatively high rotary speed to achieve a voltage which would provide an adequate heating power in the series connection of the heating resistor and the power supply network which together possess relatively high impedance.

During idle operation or a slightly increased rotary speed of the generator, this arrangement cannot deliver a sufficient heating power.

SUMMARY OF THE INVENTION

It is therefore a general object of the present invention to overcome the aforementioned the disadvantages.

More particularly, it is an object of the invention to provide an improved device for applying voltage to the heating resistor which guarantees a sufficient energization both during the standstill and during the running condition of the motor vehicle.

Another object of this invention is to provide such an improved voltage supplying device which in comparison to known solutions requires only very small additional expenditure or even lower expenditures while providing a distinctly improved energization of the heating resistor.

In keeping with these objects and others which will become apparent hereafter, one feature of this invention resides in the provision of a control device which detects and evaluates the essential operational conditions of the motor vehicle, when the vehicle engine is running, and delivers control signals to at least two two-position switching devices in such a manner that during the standstill of the motor vehicle the heating resistor is connected with the power generator while the connection between the power supply network and the generator is interrupted, and during the running condition of the motor vehicle the heating resistor, the power supply network and the generator are connected in series. The method of this invention is based on the detection of the standstill or the running condition of the motor vehicle, during the standstill condition supplying a voltage from the generator which is higher than the nominal battery voltage, to the heating resistor only, and during the running condition, a regulated generator voltage is applied to a series connection of the heating resistor and of the power supply network whereby the voltage is regulated to such a level at which the power supply network receives its nominal voltage value.

In comparison with prior art devices the invention has the advantage that the power supply can be adjusted to a momentary operational condition of the motor vehicle. At low rotary speeds of the engine and during the standstill of the motor vehicle exclusively the heating resistor is energized by the generator; during the heating-on condition and during the running condition of the vehicle the heating resistor is connected in series with the power supply network and with the power generator. The output voltage of the power generator is regulated such that the heating resistor is sufficiently energized both during the standstill and during the running condition of the vehicle.

A further advantage of this invention is the provision of a central controlling device which detects all important data or operational condition of the motor vehicle and generates corresponding signals which control an appropriate excitation or deexcitation of the power generator as well as for the suitable switchover of the heating resistor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
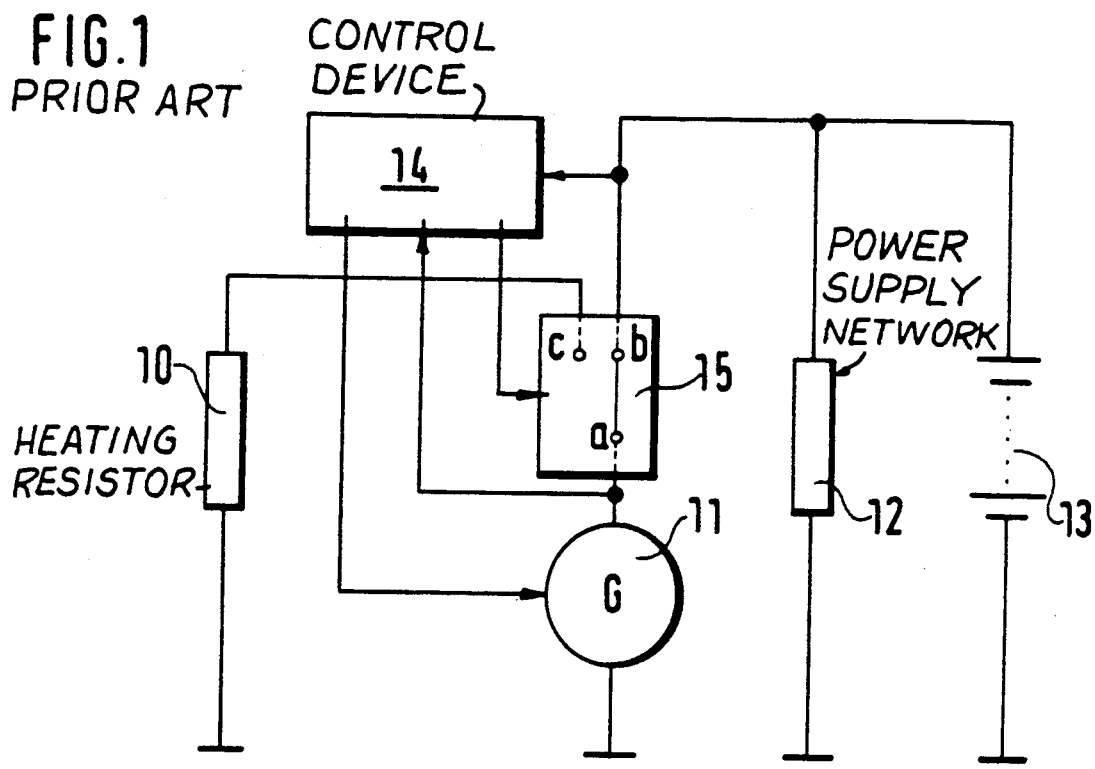
FIG. 1 shows a conventional circuit for energizing a heating resistor alternately with the energization of a power supply network.

FIG. 1 shows a prior art circuit arrangement for supplying power to a heating resistor 10 in a motor vehicle having a power generator 11, a network 12 for supplying power to non-illustrated electrical consumers, a battery 13 connected parallel to the power supply network 12, a control device 14 and a switching device 15. The parallel connection of the battery 13 and the network 12 has one terminal connected to ground and another terminal connected via the switching path a-b of the switching device 15 to the output terminal of the generator 11 whose other terminal is also grounded. The switching path a-c of the switch 15 is connected via the heating resistor 10 to ground.

The output of the control device 14 is connected to the switching device 15 to control the same according to a detected operational condition of the motor vehicle. Further connections from the control device 14 lead to a non-illustrated regulator of the generator 11, to a connection point between the output terminal of the generator 11 and the switching device 15 and to the output terminal of the parallel connection of the network 12 and the battery 13. The switching device 15 has three contacts a, b, c whereby either the contact c or the contact b is connected with a common contact a.

The generator 11 delivers voltage in dependency on the switching position of the switch 15 either to the parallel connection of the network 12 with the battery 13 or to the heating resistor 10. As mentioned before, the positions of the switching device 15 are controlled by output signals from the control device 14. During a heating-on condition, the generator 11 applies to the heating resistor 10 via the switching position a-c a nonregulated voltage which is higher than the nominal voltage of the battery 13 and the network 12. However, this is possible only during the standstill of the vehicle and for a relatively short time period because the electric consumers would discharge the battery. If it is desired to supply the network 12 with the generator voltage then the control device 14 switches over to the position a-b of the switch 15 to establish the connection to the network 12 and the battery 13 while simultaneously interrupting the connection between the heating resistor 10 and the generator.

Figure 2:
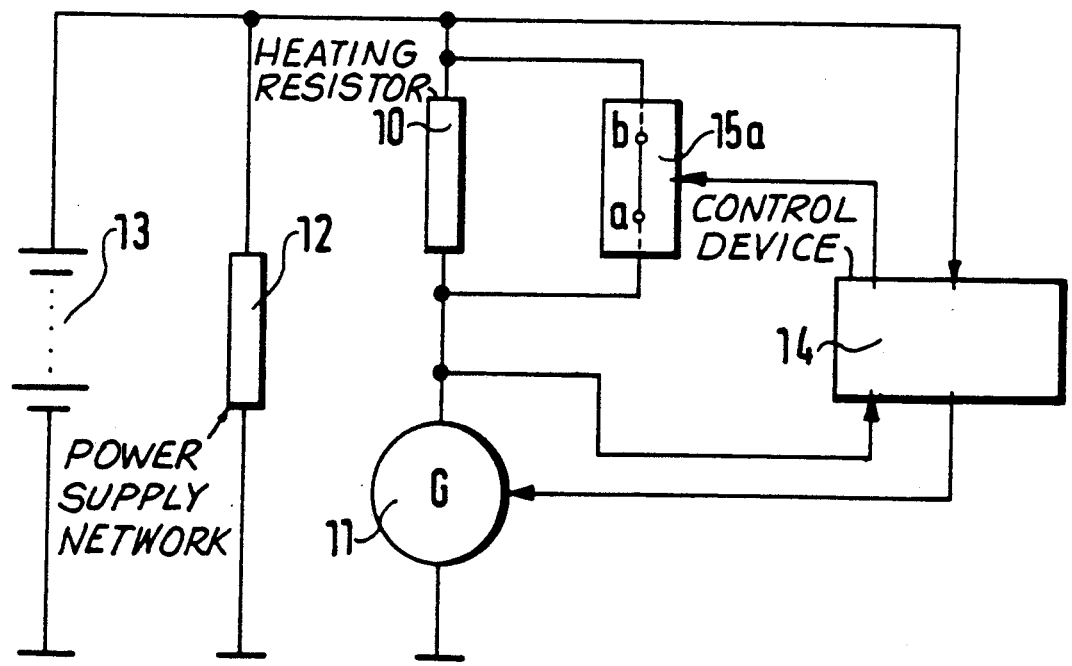
FIG. 2 shows another known circuit for energizing the heating resistor in series with the power supply network.

FIG. 2 shows a known circuit arrangement for the electrical energizing of a heating resistor 10 wherein the heating resistor 10 is connected in series with a parallel connection of the battery 13 and the power supply network 12 whereby the series connection is connected to the terminals of the power generator 11. An on/off switching device 15a is connected parallel to the heating resistor 10 and is again controlled by the output control device 14. The control device 14 is again connected to a non-illustrated regulator of the generator 11, to the connection point between the heating resistor 10 and the output terminal of the parallel connection of the network 12 and the battery 13 or another suitable point in the network 12. The control device 14 is also connected to the connection point between the generator 11 and the heating resistor 10.

The on/off switch 15 has two contacts a, b which depending on the applied control signal are either interconnected or interrupted.

During the heating-on condition both the heating resistor 10 and the network 12 with battery 13 are all supplied by the generator 11. The output voltage of the generator is regulated such that the parallel connection of the network 12 and the battery 13 receives its nominal voltage that means the output voltage of the generator is higher than the nominal voltage of the network 12 by a voltage drop across the heating resistor 10. In the heating-on operation the switch 15a is in its off position.

If it is desirable to discontinue the heating then the on/off switch 15a is switched over into its closed position via the control device 14 whereupon the heating resistor 10 is short-circuited and the output voltage of the generator 11 is applied directly to the output or connection terminal of the battery and the network. In this case, the output voltage of the generator must be regulated down to the nominal voltage of the network 12 or the battery 13.

With a sufficiently high rotary speed of the generator 12 the known circuit arrangement of FIG. 2 can insure that both the battery with the network and the heating resistor are supplied with a sufficient electrical power. At lower rpm of the generator this adequate power supply is not guaranteed.

Figure 3:
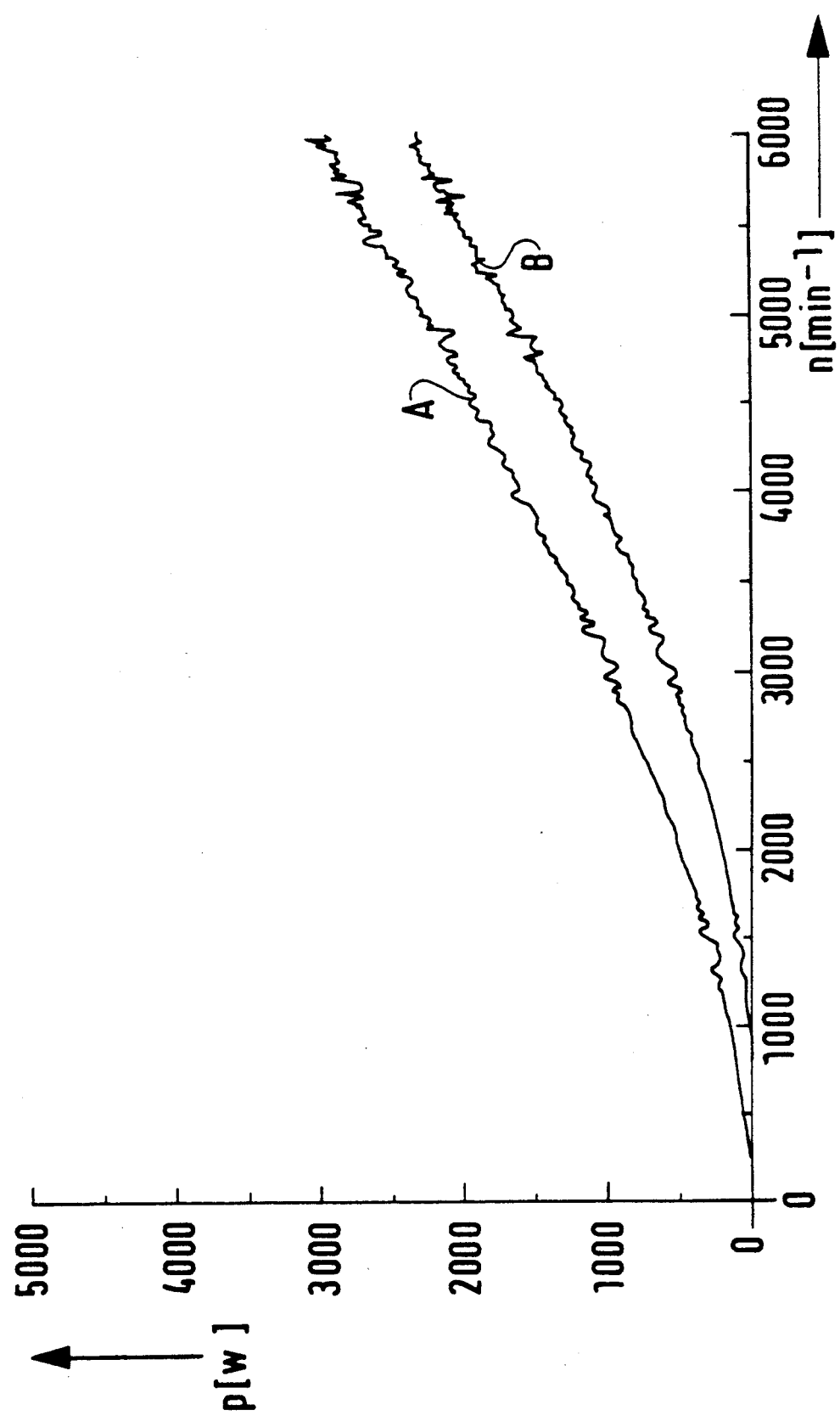
FIG. 3 shows a plot diagram of the heating power versus the rotary speed of the power generator for the prior art embodiments of FIGS. 1 and 2.

The diagram in FIG. 3 shows the relationship between the heating power p and the rotary speed n of the generator. The curve A shows the course of the heating power p in the case when the generator feeds exclusively the heating resistor according to FIG. 1. The curve B shows the course of the heating power versus the rotary speed of the generator for a series connection of the heating resistor with the parallel connection of the network and the battery, as shown in FIG. 2.

Figure 4:
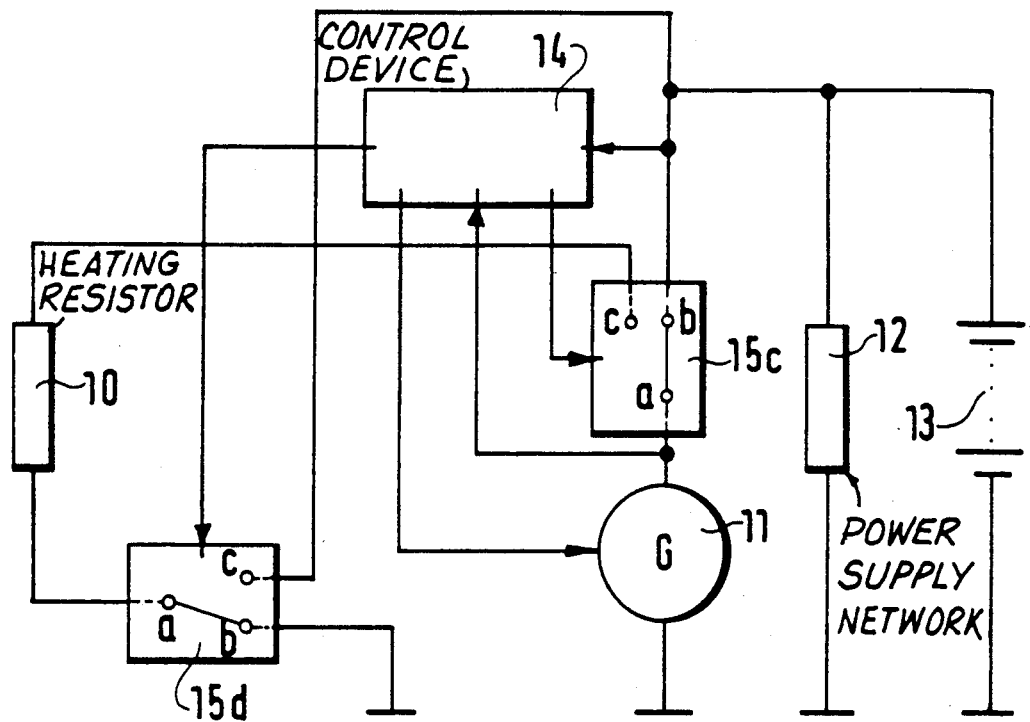
FIGS. 4 and 5 show two embodiments of the voltage supplying device of this invention.

FIG. 4 shows a first embodiment of the device of this invention. The parallel connection of the battery 13 and the power supply network 12 is connected at its output via a switching path b-a to the output terminal of the generator 11. The other switching path c-a of the switch 15c is connected to one end of the heating resistor 10 whose other end is connected via a switching path a-b of a second switching device 15d to the ground. The other switching path a-c of the second switching device 15d is connected to the output point of the parallel connection of the network 12 and the battery 13 or to another suitable connection point of the network behind the first switching device 15c. The connections from the control device 14 lead to the respective switching devices 15c and 15d, to a non-illustrated regulator of the generator 11 and to the connection point between the input terminal of the generator 11 with the first switching device 15c and to the connection point between the contact b of the first switching device 15c and the output or connection terminal of the power supply network 12 or of the battery 13 or to another non-illustrated point in the network.

The operation of the circuit arrangement according to FIG. 4 is as follows:

During the heating-off operational condition the parallel connection of the power supply network 12 with the battery 13 is supplied with voltage from the generator 11 via the switched on connection path a-b of the first switching device 15c. The other connection path c-a between the generator 11 and the heating resistor 10 in the first switching device is interrupted. The generator 11 is regulated to deliver the nominal voltage of the network or the battery.

If the control device 14 which detects and evaluates all important operational data or conditions such as standstill or running condition of the motor vehicle, the output voltage of the power generator, the battery voltage, temperature and the like, delivers a heating-on control signal to the first switching device 15c, the latter switches over to the connection a-c to apply the generator voltage to the heating resistor 10. If the control device 14 detects the standstill of the motor vehicle, it delivers a corresponding standstill condition control signal to the second switching device 15d to set therein the switching path a-b connecting the heating resistor 10 to ground. Accordingly, the connection between the generator 11 and the power supply network 12 is interrupted and the voltage from the generator 11 is applied directly to the heating resistor 10.

If the control 14 detects that the motor vehicle is running, it delivers a corresponding running condition control signal to the second switching device 15d and switches the same to the connection path a-c, thus interrupting the direct connection of the heating resistor to ground and establishing instead a series connection of the generator 11, the heating resistor 10 and the power supply network 12 including the battery 13. The direct connection between the generator 11 and the network 12, 13 remains interrupted by the first switching device 15c.

Accordingly, in the standstill condition of the motor vehicle, the voltage of power generator 11 is applied to the heating resistor 10 only while in the running condition of the vehicle the voltage of the generator is applied to the series connection of the heating resistor 10 and the parallel connection of the network 12 and the battery 13.

The control device 14 also controls a non-illustrated regulator in the generator 11 such that during the standstill condition of the vehicle the output voltage of the generator is substantially increased, for example to 70 volts to provide an improved heating efficiency of the heating resistor 10. During the running condition of the vehicle the generator voltage is regulated such as to maintain a constant nominal voltage, for example 14.6 volts across the parallel connection of the network 12 and the battery 13. The control device 14 senses the voltage at the connection point between the network 12 and the heating resistor 10 and delivers a regulation control signal for energizing or de-energizing the power generator 11.

If the requisite nominal voltage across the power supply 12 cannot be maintained, the control device 14 switches over to the heating-off condition.

Figure 5:
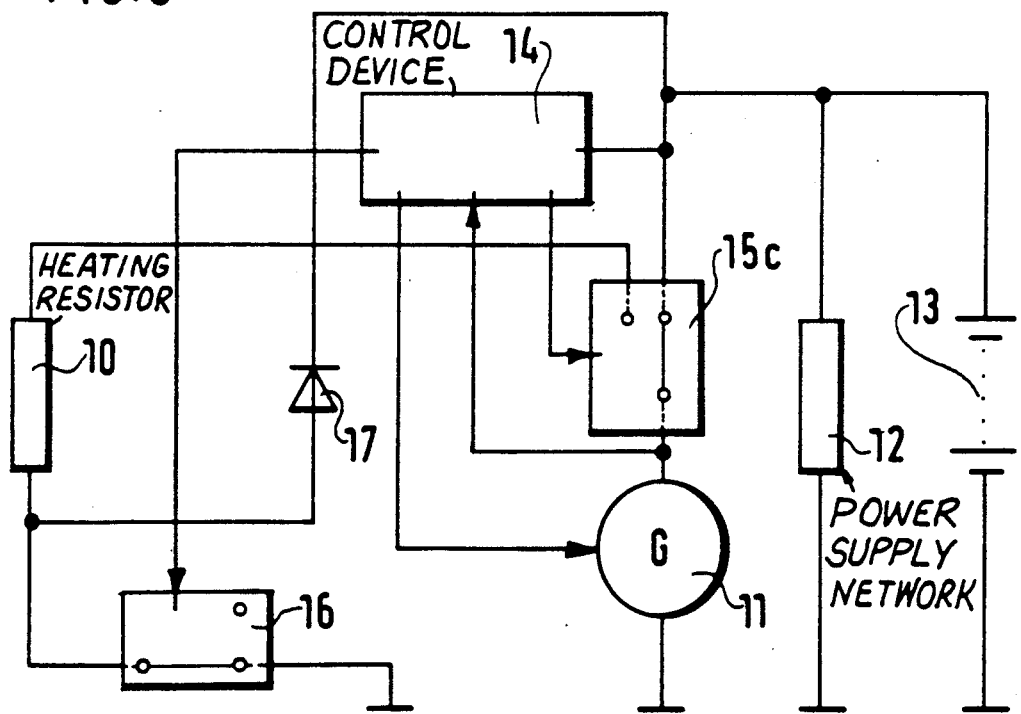

The second embodiment of this invention illustrated in FIG. 5 has in principle the same structure as the embodiment of FIG. 4 with the exception that the two-position switching device 15d is replaced by an on/off switch 16 and connection point between the heating resistor 10 and the on/off switch 16 is connected via a diode 17 with the output of the parallel connection of the network 12 and battery 13. The diode 17 is connected in blocking direction relative to the battery 13.

The operation of the circuit arrangement according to FIG. 5 is as follows:

During heating-off condition, the parallel connection of the network 12 and battery 13 is directly supplied via connection path a-b of the first switching device 15c with the voltage from the generator 11 and switching path a-c to the heating resistor is interrupted.

During the heating-on condition the first switching device 15c is switched over by the control device 14 such that the connection path a-b is interrupted and the voltage of the generator is applied via the connection path a-c to the heating resistor 10. If the control device 14 senses the standstill condition of the motor vehicle, a corresponding standstill condition control signal activates the switch 16 into its on state to establish a direct connection between the resistor 10 and the ground. Consequently, the circuit heating resistor 10, generator 11, and ground is closed whereas the circuit network 12 with battery 13, ground and generator 11 is opened.

If the control device 14 detects that the motor vehicle is moving, it switches over the switch 16 into its off state to interrupt the connection between the heating resistor 10 and ground. As a result, the generator 11, the heating resistor 10 and the network 12 with battery 13 are connected in series with the diode 17 and voltage is applied both to the heating resistor and to the network 12 and battery 13.

The regulation of the output voltage of the generator is analogous to the embodiment of FIG. 4, that means during the standstill of the vehicle when the network 12 and the battery 13 are disconnected from the generator, the output voltage of the generator is substantially increased. During running of the vehicle, when the heating resistor 10 and the network 12 with the battery 13 are connected in series, the output voltage of the generator is regulated with reference to the nominal voltage across the parallel connection of the network 12 and the battery 13.

The diode 17 acts as a decoupling element which prevents current flow from the battery through the heating resistor 10 into the generator 11.

By virtue of the provision of a different voltage applied to the heating resistor during the standstill of the motor vehicle and during its running, a high heating efficiency is guaranteed both in the idling mode of operation as well as at high rotary speeds. The division into two voltage ranges according to the standstill and the travel can be also determined such that below a certain rotary speed of the engine and hence of the power generator the output voltage is directly applied to the heating resistor 10 similarly as during the standstill of the motor vehicle whereas above a certain rotary speed level the voltage is applied to the series connection of the heating resistor 10 and the network 12 with the battery 13.

The switching devices 15c, 15d and 16 can be in the form of electromechanical switches such as relays or purely electronic switches for example semiconductive switches.

The heating resistor can be in the form of a pane heater or any suitable electrical motor car heating for cooling water or for directly heating the interior of the car by means of a blower.

What is claimed as new and desired to be protected by Letters Patent is set forth in the appended claims:

1. A device for applying voltage to a heating resistor in a motor vehicle having a power generator driven by the vehicle engine and a power supply network connected across terminals of a battery, comprising control means for delivering a heating control signal and signals corresponding to operational conditions of the motor vehicle inclusive of standstill, running and temperature conditions of the motor vehicle; first switching means responsive to the heating control signal to connect said power generator in parallel to one of said power supply network and one end of said heating resistor when heating is demanded; and second switching means connected to the other end of said heating resistor and being responsive to one of said standstill and running condition signals, said second switching means connecting, when the parallel connection between the power generator and the power supply network is interrupted, said heating resistor parallel to said power generator in response to the standstill condition signal, and connecting said heating resistor in series with said power generator and said power supply network in response to the running condition signal.

2. A device as defined in claim 1, wherein one terminal of said battery and one terminal of said power generator are connected to ground, said first switching means includes a two-position switch connected in one position thereof between the other terminal of said power generator and the other terminal of said battery and, in the other position thereof, between one end of said heating resistor and said power generator; said second switching means includes a two-position switch connected in one position thereof between the other end of the heating resistor and the ground, and in the other position thereof, between said other end of the heating resistor and said other terminal of the battery.

3. A device as defined in claim 2, wherein said first and second switching means are switching relays, respectively.

4. A device as defined in claim 1, wherein said first and second switching means are semiconductive switching devices, respectively.

5. A device as defined in claim 2, wherein said second switching means is an on/off switch for connecting or disconnecting said other end of the heating resistor to ground, and further comprising a diode connected in forward direction between said other end of the heating resistor and said other terminal of the battery.

6. A device as defined in claim 1, wherein said control means further delivers a regulating signal for said power generator to regulate the same to a higher voltage than a nominal voltage of said power supply network when the heating resistor is connected parallel to said power generator and the motor vehicle is in the standstill condition.

7. A device as defined in claim 6, wherein, during the series connection of said heating resistor with said power generator and said power supply network when the vehicle is in the running condition, said regulating signal regulates the output voltage of the power generator to such a level at which the power supply network receives its nominal voltage.

8. A device as defined in claim 7, wherein said regulating signal regulates the output voltage from the power generator to said nominal voltage when the power generator is connected parallel to said power supply network.

9. A method of supplying voltage to a heating resistor in a motor vehicle having a regulated power generator driven by the vehicle engine and being normally connected parallel to a power supply network connected across terminals of a battery, comprising the steps of generating signals corresponding to different operational conditions of the motor vehicle, inclusive of a standstill a running condition; applying output voltage from said generator across the heating resistor while interrupting connection between said power supply network and said generator when heating is demanded; regulating said output voltage to exceed a nominal voltage of said power supply network when the standstill condition signal is generated; and if the running condition signal is generated, applying a regulated voltage from said generator across a series connection of said heating resistor and said power supply network; and said regulated voltage maintaining a constant voltage across said battery terminals corresponding to a nominal voltage of the power supply network.

* * * * *